Figure 1:
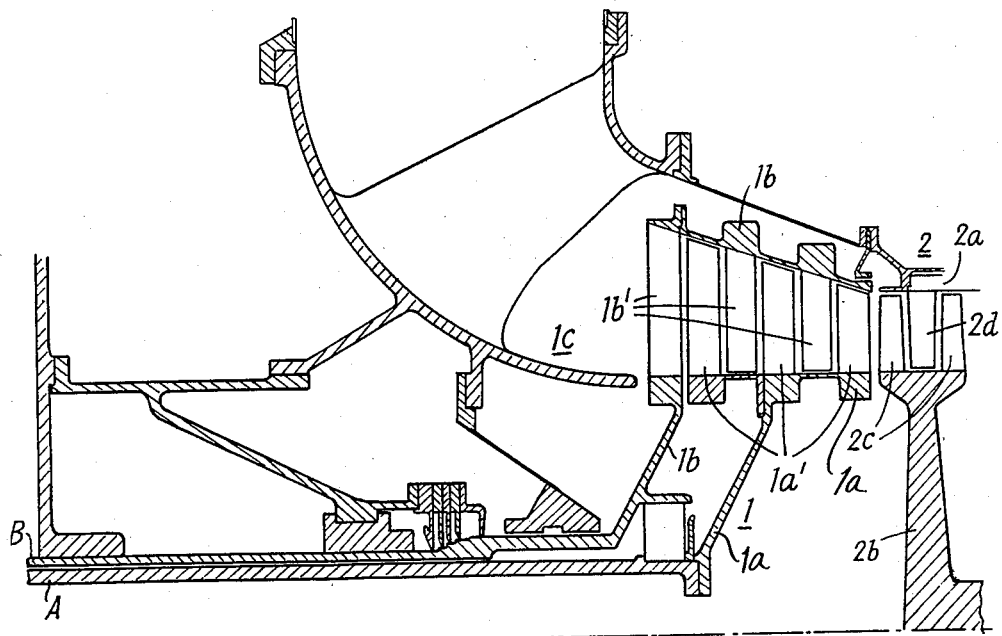

June 14, 1949.  K. BAUMANN  2,472,878
FLUID TURBINE POWER PLANT WITH SPEED
REDUCTION TRANSMISSION GEARING
Filed Jan. 6, 1944  4 Sheets-Sheet 1

INVENTOR
Karl Baumann
BY Loyd Hall Sutton
ATTORNEY

June 14, 1949.  K. BAUMANN  2,472,878
FLUID TURBINE POWER PLANT WITH SPEED
REDUCTION TRANSMISSION GEARING Filed Jan. 6, 1944  4 Sheets-Sheet 4

INVENTOR
Karl Baumann
BY Loyd Hall Sutton
ATTORNEY

Patented June 14, 1949

2,472,878

UNITED STATES PATENT OFFICE 2,472,878

FLUID TURBINE POWER PLANT WITH SPEED REDUCTION TRANSMISSION GEARING

Karl Baumann, Mere, Knutsford, England, assignor to Metropolitan-Vickers Electrical Company Limited, London, England, a company of Great Britain Application January 6, 1944, Serial No. 517,268
In Great Britain April 29, 1942

Section 1, Public Law 690, August 8, 1946
Patent expires April 29, 1962

11 Claims. (Cl. 253—16.5)

This invention relates to a power plant comprising elastic fluid turbines driving load shafts through speed reduction transmission gearing.

The invention is more particularly, but not exclusively, applicable for the propulsion of ships, vehicles and other mobile craft, such as military tanks.

According to the invention in one of its broadest aspects, as the elastic fluid turbine there is chosen one of the per se known type, namely, having mutually reacting contra-rotational members and these members are connected to the load shaft for jointly driving it through a speed reduction transmission gearing of the planetary type, the load shaft being rotated by the member or "cage" carrying the planet shafts, each of which rigidly carries as a minimum two planet wheels of different diameters, whereby to obtain the necessary speed reduction, the smaller one meshing with a gear wheel which is fixed, or normally fixed, against rotation or equivalently meshing with two such gear wheels the one internally and the other externally, which two gear wheels may alternatively be rendered fixed, whilst the larger planet wheel is driven by respective gear wheels fast with respective contra-rotational shafts or members conected with the contra-rotational rotors of the elastic fluid turbine: for said larger planet wheel there may be substituted two planet wheels of different diameters meshing with respective gear wheels of said contra-rotational connecting members or shafts, one of which last-mentioned two gear wheels may be a pinion and the other a crown wheel, although they may both be either pinions or crown wheels: for said smaller planet wheel there may similarly be substituted two planet wheels, whilst the size of one of them need not be smaller than the planet wheel or wheels directly connected to the connecting shafts. These contra-rotational shafts are conveniently coaxial, one of each being in the form of a sleeve of which the inner one may surround one end of the driven shaft and provide a bearing for the latter.

The arrangement above set forth provides a particularly convenient, simple and compact transmission gearing of relatively light weight and advantageously providing the necessary speed reduction, such as is required for the propulsion of ships, vehicles and other mobile craft, in consideration of the fact that the effective speed of the elastic fluid turbine which is inherently a high speed machine, is, in general, halved by reason of it being chosen as of the contra-rotational type. Additional reduction gearing between the turbine and the aforesaid transmission gearing or between it and the propeller may however be provided.

An important subsidiary feature of the invention is based upon the consideration that, for the propulsion of ships and other craft, it is usual to provide one or more additional turbines which are brought into use when running astern, since to reverse the rotation of the main turbine or turbines used for running ahead would, in general, be impracticable or inexpedient. According to this subsidiary feature of the invention, reversal of the propeller or other load shaft is brought about without completely reversing the turbine, by mounting the aforesaid normally fixed gear wheel (with which the smaller planet wheels mesh) so that it can rotate, and providing a pair of independently operable brakes, one adapted to hold the last-mentioned gear wheel (which is now rotatably mounted) and the other brake adapted at least to reduce the speed of one of the contra-rotational shafts, and in some cases to stop it, or to allow it to rotate at a low speed in the reverse direction. The operation of such transmission gearing will be hereinafter more fully described.

An object of the invention is the provision of a simplified power plant for the propulsion of ships, vehicles and other craft, achieved by the elimination of separate astern turbines and other devices for astern running, since such are expensive and subject to other drawbacks.

Thus, according to the invention a power plant for the propulsion of a ship, vehicle or other mobile craft comprises an elastic fluid turbine of the contra-rotational type and speed reduction transmission gearing of the planet wheel type through which the mutually reacting contra-rotational members of the turbine are adapted jointly to drive a propeller or other load shaft, the planet "cage" or like member carrying the planet shaft or shafts being arranged for rotating the propeller or load shaft and the planet shaft or shafts being each arranged to carry at least two planet wheels of different diameter fast therewith, the smaller planet wheel meshing with a rotatable gear wheel, or equivalently meshing for instance internally and externally with two independently rotatable gear wheels, whilst the larger planet wheel, or equivalently two such planet wheels of different diameter, is/are driven by respective gear wheels fast with respective contra-rotational shafts or members connected with the contra-rotational turbine rotors, and means for at will restraining against rotation the said rotatable gear wheel with which meshes the smaller planet wheel as aforesaid, together with means for at will impeding the rotation of one of the contra-rotational shafts or rotor connecting members whereby to enable reversal of the direction of rotation of the propeller or other load shaft.

Another object of the invention is to arrange for the propulsion of ships or other craft, and particularly, but not exclusively, small high speed craft, by means of internal combustion turbine plants.

It will be appreciated that, whilst it is, in general, impracticable to reverse the rotation of an elastic fluid turbine, it is possible with a contra-rotational turbine to allow one of its rotors to rotate slowly in its normal direction, or even in a direction reverse to its normal one, since useful work can be obtained so long as the two rotors rotate at different speeds.

Furthermore, in the case of a gas turbine the plant requires some considerable time for starting, and it is therefore undesirable to have to perform this operation particularly during maneuvering, such as the operations of stopping and reversing. It is desirable that the gas shall continue to flow through the blading, and this is possible in the case of the contra-rotational power gas turbine with gearing above indicated.

Whilst load control of a gas turbine plant can be effected to some extent by control of fuel admission, the range of such control may be relatively limited since there is a lower speed, still relatively great, for the air compressor and the turbine driving it, at which stalling of the compressor may take place.

In a plant according to the present invention in any aspect thereof, the contra-rotational turbine driving the load shaft may be in the form of a unit separate from that of the turbine driving the compressor, that is to say, on respectively separate shafts, although if the turbine driving the compressor is of the contra-rotational type also, it may be combined with the contra-rotational turbine driving the load shaft.

In carrying out the invention for the propulsion of craft, the main load control is expediently effected by means of the fuel supply since valves controlling the supply of the products of combustion to the turbine driving the propeller shaft are undesirably bulky and heavy whilst being difficult to design and operate. And it will be appreciated that, by obviating the use of a separate gas turbine plant for astern running, these is also obviated the necessary piping and control valves which are bulky, heavy and difficult to arrange.

Another advantage arising from the employment of a contra-rotatinoal turbine for driving the load shaft is that turbines, and particularly gas turbines, which have stationary blades are the more difficult to design, whilst the temperature conditions are such that the resulting distortions are relatively very severe, particularly since the weight of the parts exposed to high temperature in the singly-rotating plant is greater than in a contra-rotation plant. Furthermore, in the contra-rotational turbine, since the peripheral normal speeds of the two rotors are lower, the centrifugal stresses may be maintained requisitely low, particularly in relation to designing a machine of light weight. The blading of the contra-rotational turbine stages is easier to manufacture since less twist is required in the blades.

In carrying out the aforesaid important subsidiary feature of the invention for a plant of relatively small power, the brakes may be of the mechanical type such as band brakes, or friction clutches, or electro-mechanical brakes or other brakes capable of slowing down at least one of the rotors of the turbine. However, when the gas or other contra-rotational turbine driving the propeller or other load shaft has either or both of its contra-rotational rotors still in rotation with the propeller or load shaft stopped, there is remanent power which it is necessary to absorb other than by the driving of the propeller shaft and propeller, and the brakes must be capable of absorbing at least a part of this power.

The arrangement according to said subsidiary feature of the invention is such that when the load shaft is rotating in one direction, for example for ahead running of a ship, the rotatable gear wheel is braked or locked against rotation whilst the other brake is released so that both power shafts of the contra-rotational turbine are rotating normally and if so desired, at equal or approximately equal speeds. For causing the load shaft to rotate in the opposite direction such as for propelling the ship astern, the previously applied brake is now released and the other one is applied, whereby the power shaft with which it is associated is retarded or held against rotation. It will be appreciated that when both brakes are applied simultaneously, the load shafts and the power shafts, and thus the turbine, are retarded or brought to rest.

According to a further important subsidiary feature of the invention, applicable in a plant of relatively large power, there is incorporated in the transmission gear a power absorbing slipping clutch or coupling which may be of the electric type, but is preferably a hydraulic coupling capable of absorbing the remanent turbine power and reducing the speed of one of the rotors to a low value. This coupling may, in some cases, replace the second of the two brakes aforesaid, or it may be used in addition thereto, said second mechanical brake being used mainly to lock the member when its speed has been requisitely reduced.

In order that the invention may be fully understood, reference will now be made, by way of example, to the accompanying diagrammatic drawings, in which—

Figure 2:
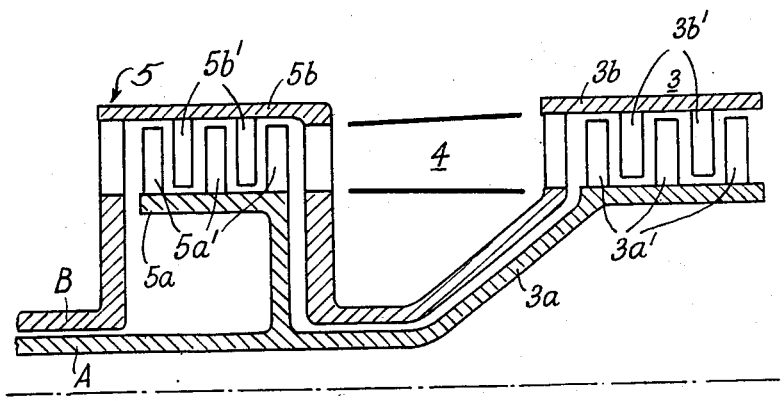

Fig. 1 illustrates, in conventional sectional form, the upper half of a contro-rotational gas turbine embodied in a power plant according to the invention, whilst Fig. 2 illustrates, in conventional sectional form, part of the upper half of an alternative form of contra-rotational gas turbine embodied in a power plant according to the invention, and Figs. 3 to 9 inclusive show, in conventional sectional form, the upper halves of respectively different arrangements of speed reduction transmission gearing according to the invention for coupling the contra-rotational turbine rotors of a power plant to a load shaft, like parts in the several figures being indicated where necessary by like reference characters.

In one form of power plant according to the invention, which is illustrated in part in Fig. 1, the main power turbine of the plant is constituted by an axial-flow gas turbine of the contra-rotational type. This turbine, indicated generally at 1, comprises two mutually reacting contra-rotational rotors 1a and 1b mounted for rotation on coaxial hollow shafts A and B respectively, the rotor 1a being provided with three stages or rows of blading indicated at 1a', while the other rotor 1b is provided with three co-operating stages or rows of blading, indicated at 1b'. The rotors 1a and 1b are enclosed in chamber 1c into which discharges the energetic exhaust from an auxiliary gas turbine indicated at 2. As shown, the turbine 2 is of the axial-flow uni-rotational type, comprising an annular chamber 2a and a rotor 2b provided with two stages or rows 2c of turbine blading between which is row 2d of fixed blading. This turbine 2 drives an axial-flow compressor (not shown in the drawing but which will be situated to the right of turbine 2 of Fig. 1) for supplying combustion air to a combustion chamber (also not shown) the energetic discharge from which passes first through turbine 2 and thence into turbine 1. This compressor will generally be of the uni-rotational type, that is with a single rotor and stationary guide blading.

In this power plant it will be appreciated that, with the turbine 2 driving the associated compressor for combustion air and discharging with remanent energy into the main power turbine 1, the shafts A and B will be independently rotated. In accordance with the invention, these power shafts A and B are adapted to be coupled to, so as jointly to drive, a common load shaft through transmission gearing as hereinafter to be described.

In an alternative arrangement of power plant which is also contemplated according to the invention, the main power turbine of the plant is of the contra-rotational type and is gas driven, but in this case there is utilised a contra-rotational compressor instead of a uni-rotational compressor as in the previously described arrangement. In this alternative form, as illustrated in Fig. 2, the compressor, indicated generally at 3, comprises two mutually reacting contra-rotational members 3a and 3b provided with respective rows of blades 3a' and 3b' for supplying combustion air to a combustion chamber 4, the energetic gaseous exhaust from which discharges into the main power turbine of the plant, which is indicated generally at 5 as having mutually reacting contra-rotational members 5a and 5b provided with co-operating rows of blading 5a' and 5b' respectively. As shown, the mutually reacting contra-rotational members of the power turbine 5 are attached to sleeves A and B respectively and are also attached to the mutually reacting contra-rotational members 3a and 3b of the compressor. It will be appreciated that the sleeves A and B constitute hollow power shafts, similar to those correspondingly designated in the arrangement illustrated in Fig. 1, and adapted to be connected for driving a common load shaft through gearing as presently to be described.

Figure 3:
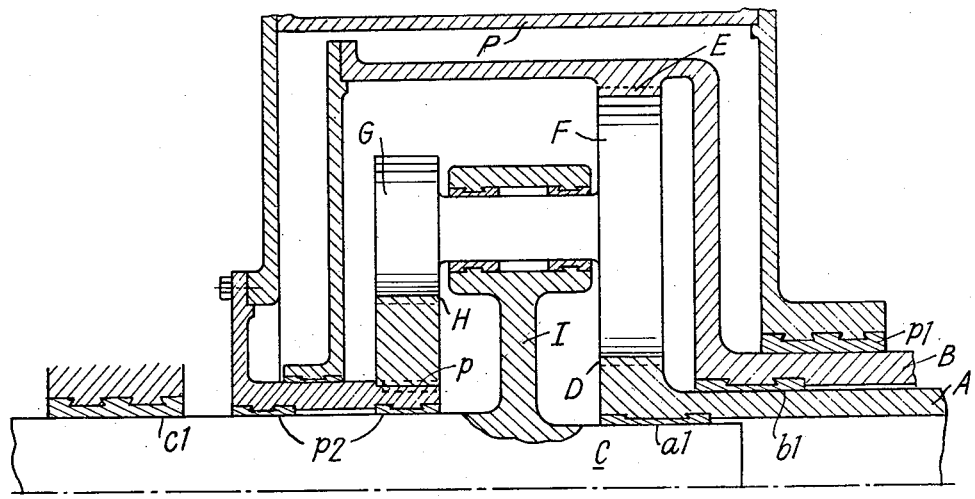

One form of speed reduction transmission gearing for inclusion in a power plant according to this invention, whereby the contra-rotational power shafts attached to the contra-rotational rotors of the main power turbine of the plant are enabled jointly to drive a common load shaft, is illustrated in Fig. 3, to which reference will now be made.

The contra-rotational power shafts are shown at A and B respectively, while at C is indicated the load shaft; in a power plant used for ship propulsion, for example, the load shaft C may constitute the main propeller shaft or may be a shaft coupled through other gearing, which may or may not afford further speed reduction, to the main propeller shaft.

As shown, the inner power shaft A provides a bearing a1 for the load shaft C, another bearing for which is shown at c1, while the outer power shaft B provides a bearing b1 for the load shaft A. The power shaft A has connected to it, at its end, a pinion D, whilst the power shaft B has connected to it an internally toothed or crown wheel E. Meshing with pinion D and also with crown wheel E is a planet wheel F. The planet wheel F is fast at one end to a shaft, the other end of which has fast to it a planet wheel G which is of smaller diameter than is planet wheel F. The planet wheels F and G with their connecting shaft are carried in a planet "cage" I which is connected, in the specific form shown integrally, though this is not essential, to the load shaft C. The smaller planet wheel G meshes with a gear wheel H which, in this arrangement, is fixed against rotation, namely by being keyed as indicated at p to casing P which, in turn, is fixed against rotation in a manner not shown and which provides a bearing p1 for the outer power shaft B and bearings p2 for the load shaft C. It will be appreciated that, whereas only one set of planet wheels F and G, together with their connecting shaft, is shown, the gearing may include several such planet wheel sets carried by the planet cage I and circularly distributed around the load shaft C, with all the larger planet wheels F meshing with pinion D and crown wheel E and the smaller planet wheels G meshing with gear wheel H.

With the arrangement of gearing just described, the contra-rotational power shafts A and B, which will usually be rotated by the power turbine at equal speeds, will rotate the planet wheels F and G and, with the gear wheel H meshing with the planet wheel or wheels G, fixed against rotation as described, the load shaft C will be rotated at a reduced speed, namely as determined by the gear diameter relationship. The arrangement may be used in circumstances where reversal of the direction of rotation of the load shaft is not specially required.

In circumstances where it may be desirable or expedient at any time to cause reversal of the load shaft, as for example, in a propulsion system for a ship or other mobile craft, an arrangement of transmission gearing such as those illustrated in Figs. 4 to 9 inclusive may be employed for connecting the contra-rotational shafts of the power turbine to the propeller or other load shaft, either directly or through further speed reduction gearing according to circumstances.

Figure 4:
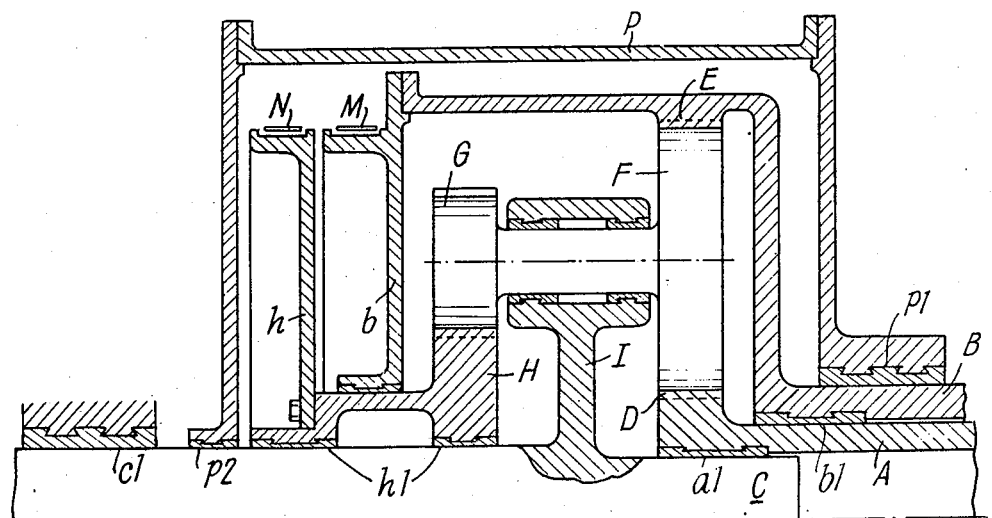

Referring to the arrangement illustrated in Fig. 4, the inner power shaft A, which surrounds and provides bearing a1 for the propeller or other load shaft C, has connected to it the pinion D, whilst the outer power shaft B, providing bearing b1 for power shaft A, has connected to it crown wheel E, the pinion D and crown wheel E meshing with one or more planet wheels F fast to a shaft or shafts to which one or more smaller planet wheels G is/are attached and which shaft or shafts is/are carried by planet cage I connected to the load shaft C, and the whole gearing being enclosed in casing P providing bearing $p1$ for the outer power shaft B and bearing $p2$ for the load shaft C, all as in the previously described arrangement. However, in the arrangement of Fig. 4, the smaller planet wheel or wheels G mesh with a gear wheel H which is rotatably mounted at bearing $h1$ on the propeller or load shaft C. Further, there is provided a brake M for impeding rotation of the outer power shaft B, this brake being hereinafter referred to for convenience of description as the "power" brake and in this case being represented as being of the band type, and acting upon a cage or frame $b$ attached to an extension of the outer power shaft B. Another brake, indicated at N, is provided for restraining the gear wheel H, this brake N being shown as acting upon a cage or frame $h$ attached to an extension of the gear wheel H. The brake N is hereinafter referred to for convenience of description as the "directional" brake, being applied for establishing ahead-running conditions for the propeller or load shaft and released for establishing astern-running conditions. With this arrangement of the transmission gear, for, say, ahead-running of the propeller or other load shaft C, the "power" brake M is released whilst the "directional" brake N is applied, thereby holding the associated gear wheel H against rotation; in these circumstances, and with the power shafts A and B rotating in opposite directions, either at the same speed as will be usual, or at different speeds, the propeller or load shaft C will accordingly be driven in the appropriate direction at a speed determined by the gear diameter relationship. For stopping the propeller or load shaft C, both "power" brake M and "directional" brake N are applied, the former impeding, and if desired locking against rotation, the power shaft B, and the brake N similarly functioning in relation to the gear wheel H. For going astern the "power" brake M is applied, thereby bringing the outer power shaft B nearly or quite to rest, whilst the "directional" brake N is released, thus to free the gear wheel H; in these circumstances, and with the inner power shaft A continuing to rotate at any appropriate speed, the propeller or load shaft C will be caused to rotate at properly reduced speed and in the reverse direction to that in which is was previously rotated.

It will be appreciated that in the case of a stoppage of the propeller shaft during manoeuvring, the turbine driving the compressor will continue to run and therefore the products of combustion leaving that turbine will continue to pass through the power turbine; hence it will be advantageous for one or both rotors of that turbine to rotate slowly rather than be actually locked.

Figure 5:
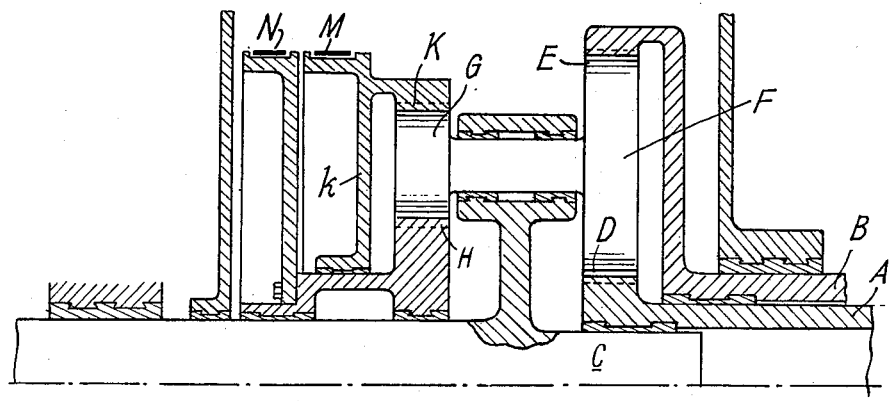

The arrangement illustrated in Fig. 5 is similar to that of Fig. 4 in that the larger planet wheels F are engaged respectively by pinion D and crown wheel E, connected to the inner and outer power shafts A and B respectively, while the smaller planet wheels G mesh with rotatable gear wheel H having an associated brake N, herein referred to as the "directional" brake; but in this arrangement of Fig. 5 the "power" brake M, instead of being applied directly to power shaft B, is applied to a further crown wheel K engaging with the smaller planet gear wheel or wheels G, in this case brake M being shown as acting upon cage or frame $k$ attached to crown wheel K. For going ahead, the "power" brake M is released whilst the "directional" brake N is applied thereby locking gear wheel H against rotation, and, with power shafts A and B rotating in opposite directions at appropriate speed or speeds, the propeller or load shaft C is driven at reduced speed in the appropriate direction. When stopping, both the "power" brake M and the "directional" brake N are applied, so that one or more of the power shafts A and B and the load shaft C are brought to rest or nearly so. For going astern, the "power" brake M is applied and the "directional" brake N is released; in these circumstances and with the inner power shaft A rotating at normal speed, the outer power shaft B will revolve slowly in the same direction as normally and the propeller or load shaft C will rotate at a slow reverse speed; if a normal or high reverse speed of the propeller or load shaft C is required, provision should be made, preferably by control of fuel to the combustion chamber of the gas turbine plant, for rotating the inner power shaft A at a speed higher than its usual value.

Figure 6:
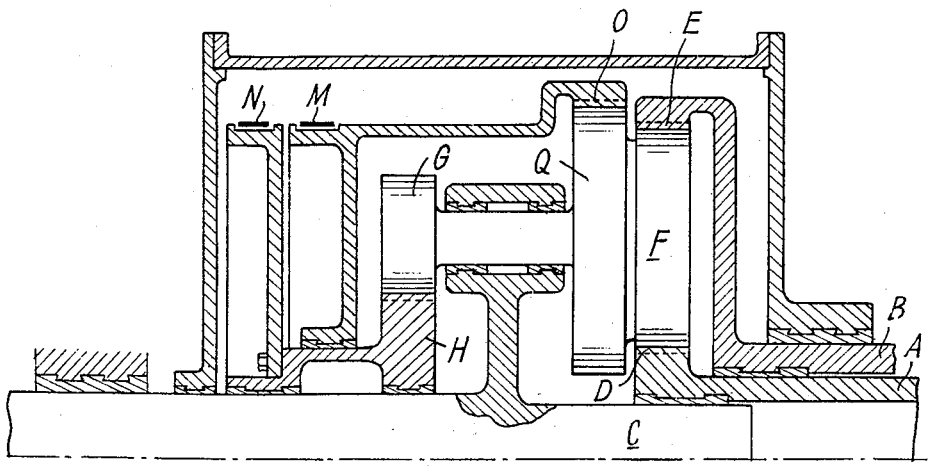

In the arrangement illustrated in Fig. 6, pinion D and crown wheel E connected to the power shafts A and B respectively, mesh with the larger planet wheels F and the smaller planet wheels G mesh with rotatable gear wheel H with which is asssociated the "directional" brake N, as in the arrangements illustrated in Figs. 4 and 5. However, as shown in Fig. 6, the brake M, which is the "power" brake, is applied to a crown wheel O which meshes with additional planet wheels Q fast with the same shafts as are the planet wheels G and F; the planet wheels Q are, in this case, shown as being of larger diameter than the planet wheels F and G, although this is not essential. With this arrangement, when going astern, the "power" brake M is applied, while the "directional" brake N is released, and in these circumstances the outer power shaft B may run at a slow speed according to the gear diameter relationship and it may do so in the direction of rotation reverse to its normal whilst the inner power shaft A rotates normally.

Figure 7:
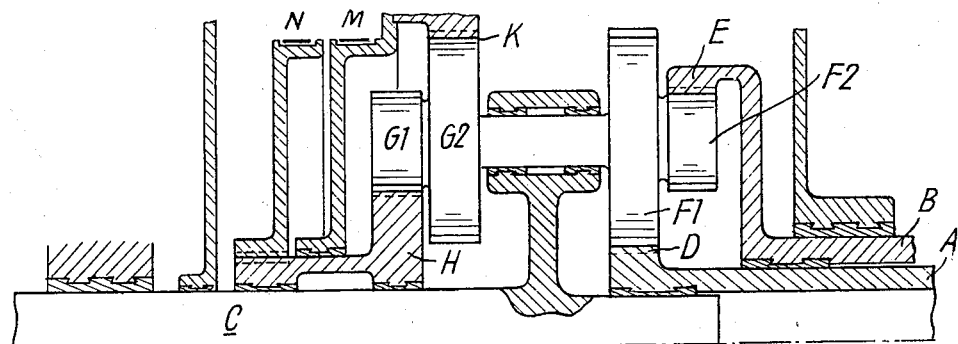

In the arrangement illustrated in Fig. 7, there are four planet wheels fast with each planet shaft, namely a large planet wheel F1 and a smaller planet wheel F2 at one end, meshing respectively with pinion D and crown wheel E connected to the power shafts A and B respectively, while at the other end are smaller planet wheel G1 and larger planet wheel G2 meshing with rotatable gear wheel H and crown wheel K respectively. The "power" brake M acts upon the crown wheel K while the "directional" brake N acts upon the rotatable gear wheel H. The operation is similar to that of Fig. 5 except that the speed ratios are different.

Figure 8:
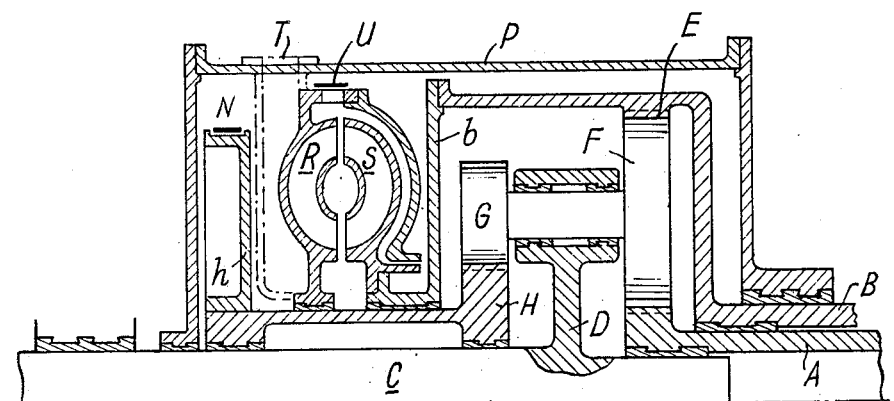

In the arrangement illustrated in Fig. 8, the larger planet wheels F mesh with pinion D and crown wheel E connected to the power shafts A and B respectively while the smaller planet wheels G mesh with rotatable gear wheel H with which is associated the "directional" brake N as in the arrangement of Fig. 4. However, as represented in Fig. 8, the "power" brake is constituted by a hydraulic coupling. This hydraulic coupling is indicated conventionally as comprising two co-operating rotor elements R and S respectively, enclosed in a casing to which fluid such as oil can be supplied through inlet T for coupling the elements R and S and from which fluid can be drained through valve U for releasing the coupling. The element R is held stationary through casing P, while the element S is connected with the outer power shaft B, being conveniently connected to the cage or frame $b$ attached to an extension of the shaft B. With this arrangement, for ahead running the "directional" brake N only is applied and the hydraulic coupling R, S is empty of coupling fluid. For stopping the propeller or load shaft C, the "directional" brake N is released and the hydraulic coupling R, S is fed with coupling fluid, the load on the power shafts A and B being reduced, conveniently by reducing the fuel inlet to the combustion chamber for the power turbine; in these circumstances, the propeller or load shaft C can be brought to rest whilst the power shafts A and B may be still revolving in opposite directions, though with the shaft B rotating at a lower speed than the shaft A. For astern running, the "directional" brake N is released and the hydraulic coupling R, S is filled; in these circumstances and with the power shaft A revolving at higher speed than normal, the speed of the power shaft B is reduced to a low value and the propeller or load shaft C will rotate in the reverse direction at appropriately reduced speed.

Figure 9:
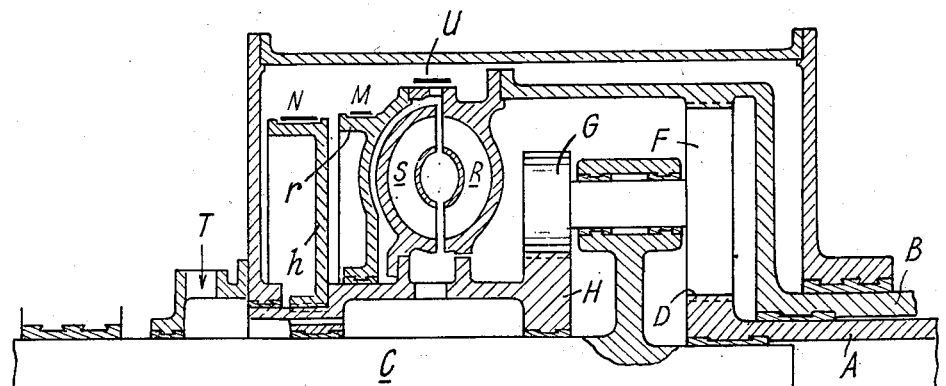

The arrangement illustrated in Fig. 9 is generally similar to that shown in Fig. 8, but, in the case of Fig. 9, one of the co-operating members R of the hydraulic coupling, whilst being connected to the power shaft B so as to be rotatable therewith is provided with a brake M, herein referred to as the "power" brake and shown as acting on cage r attached to element R, whilst the other co-operating coupling member S is connected to, so as to be rotatable with, the gear wheel H engaging with smaller planet wheel G; the "directional" brake N acts upon cage h attached to gear wheel H. With this arrangement for going ahead the "directional" brake N is applied, the "power" brake M being released and the hydraulic coupling R, S being empty so that both the power shafts A and B rotate in normal contra-rotational directions and the propeller or load shaft C is rotated at reduced speed in the appropriate direction. For stopping, both brakes M and N are released and the hydraulic coupling, R, S is filled; in these circumstances, the load on the power shaft B is acordingly reduced and the torque on the propeller or load shaft reduced to zero. The coupling R, S when filled acts to impede rotation of both power shafts A and B. If the "directional" brake N only is applied and the coupling R, S is filled, a braking action is applied to the load shaft C as well. For going astern, the "power" brake M is applied and the "directional" brake N is released so that the power shaft B is stationary and with the hydraulic coupling R, S empty, the power shaft A may revolve in the same direction as normally; for full normal speed of the rotating power shaft A, the reverse speed of the load shaft C is reduced compared with that of normal ahead running.

It will be appreciated that, when the hydraulic coupling R, S is brought into action temporarily for changing from ahead to astern running, or vice versa, the action is such that whatever power is developed by the contra-rotational turbine, no torque will be applied to the propeller or load shaft C provided that the power-absorbing capacity of the coupling R, S is adequate.

The hydraulic coupling R, S need only have such capacity that it will act as a brake on the power shafts A and B so that when the load on the main power turbine is reduced to a value dictated by the stalling of the compressor or other considerations in the complete internal combustion turbine plant, all the rotors are slowed down sufficiently that the application of the controlling brakes M and N can be effected without trouble, including the adoption of a reasonable size and design for the brakes. When the propeller or load shaft C is brought to rest, the turbine otherwise driving it need not be brought to rest so that any tendency to uneven temperature distortion, such as would occur in a standing turbine, is minimised.

I claim:

1. A power plant comprising an internal combustion turbine having two mutually-reacting contra-rotational bladed driving elements and a pair of concentric shafts respectively connected to said bladed driving elements, a load shaft, and speed reduction and reversing gearing connecting said concentric shafts with said load shaft including a planetary spider secured to the load shaft, a planet shaft journalled in said spider and operatively connected with said concentric shafts so as to be rotated thereby, a sun wheel geared to said planet shaft, a ring gear wheel geared to said planet shaft, brake means operable to restrain movement of said sun wheel and said ring gear wheel respectively, and means for selectively operating said brake means to stop rotation and then reverse the direction of rotation of said load shaft.

2. A power plant comprising an internal combustion turbine having two mutually-reacting contra-rotational bladed driving elements and concentric shafts respectively connected to said bladed driving elements so as to be rotated thereby in opposite directions, a load shaft, a planetary spider secured to the load shaft, a planet shaft journalled in said spider, gearing interconnecting said oppositely rotating shafts jointly to rotate said planet shaft, a planet wheel fast on said planet shaft, a sun wheel in mesh with said planet wheel, and means for locking said sun wheel against rotation.

3. A power plant comprising an internal combustion turbine having two mutually-reacting contra-rotational bladed driving elements and concentric shafts respectively connected to said bladed driving elements so as to be rotated thereby in opposite directions, a load shaft, a planetary spider secured to the load shaft, a planet shaft journalled in said spider, gearing interconnecting said oppositely rotating shafts jointly to rotate said planet shaft, a sun wheel geared to said planet shaft, a ring gear wheel geared to said planet shaft, and means for selectively restraining said sun wheel and said ring gear wheel against rotation.

4. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider and having a plurality of planet wheels fast thereon, a sun wheel fast on one of said oppositely rotating shafts in mesh with one of said planet wheels, a ring gear wheel fast on the other of said oppositely rotating shafts in mesh with one of said planet wheels, a second ring gear wheel and a second sun wheel each in mesh with a planet wheel, and means for reversing the direction of rotation of said load shaft including braking means for selectively restraining rotation of said second ring gear wheel and said second sun wheel.

5. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a plurality of planet wheels fast thereon, a sun wheel fast on one of said oppositely rotating shafts in mesh with one of said planet wheels, a ring gear wheel fast on the other of said oppositely rotating shafts in mesh with one of said planet wheels and a second sun wheel in mesh with a planet wheel, and means for reversing the direction of rotation of said load shaft including braking means for selectively restraining rotation of said ring gear wheel and said second sun wheel.

6. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a pair of planet wheels fast thereon, a sun wheel fast on one of said oppositely rotating shafts, a ring gear wheel fast on the other of said oppositely rotating shafts, both said sun wheel and said ring gear wheel meshing with one of said planet wheels, and a second sun wheel meshing with the other of said planet wheels, and brake means for restraining said second sun wheel against rotation.

7. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a pair of planet wheels fast thereon, a sun wheel fast on one of said oppositely rotating shafts, a ring gear wheel fast on the other of said oppositely rotating shafts, both said sun wheel and said ring gear wheel meshing with one of said planet wheels, and a second sun wheel meshing with the other of said planet wheels, brake means for restraining said second sun wheel against rotation, and additional brake means for restraining said ring gear wheel against rotation.

8. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a pair of planet wheels fast thereon, a sun wheel fast on one of said oppositely rotating shafts, a ring gear wheel fast on the other of said oppositely rotating shafts, both said sun wheel and said ring gear wheel meshing with one of said planet wheels, and a second sun wheel meshing with the other of said planet wheels, brake means for restraining said second sun wheel against rotation, and additional brake means for restraining said ring gear wheel against rotation, said second brake means comprising an hydraulic coupling having two co-operating fluid-couplable elements one of which is fast with said ring gear wheel and the other of which is fixed, and means for controlling the extent of fluid coupling between said co-operating elements.

9. A power plant comprising an internal combustion turbine having two mutually-reacting contra-rotational bladed driving rotors and concentric shafts respectively connected to said bladed driving rotors so as to be rotated thereby in opposite directions, a load shaft, planetary gearing connecting said oppositely rotating shafts jointly to drive said load shaft including a planetary spider fast with the load shaft, a planet shaft journalled in said spider, two planet wheels of different diameters fast with said planet shaft, a sun wheel and a ring gear wheel fast respectively with said concentric shafts for jointly rotating the planet wheel of larger diameter, and a second sun wheel in mesh with the planet wheel of smaller diameter, means for restraining rotation of said second sun wheel, a hydraulic coupling having an outer rotatable element fast with one of the concentric shafts, an inner rotatable element spaced from said outer element and fast with said second sun wheel, valve means for controlling entrance and exit of coupling fluid to the space between said outer and inner rotatable elements of the coupling, and braking means acting on the outer element for restraining rotation thereof.

10. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a pair of planet wheels fast thereon, a sun wheel fast on one of said oppositely rotating shafts, a ring gear wheel fast on the other of said oppositely rotating shafts, both said sun wheel and said ring gear wheel meshing with one of said planet wheels, a second sun wheel and a second ring gear wheel each in mesh with the other of said planet wheels, brake means for restraining said second sun wheel against rotation, and additional brake means for restraining said second ring gear wheel against rotation.

11. A power plant comprising an internal combustion turbine having two mutually-reacting contra-rotational bladed driving elements and concentric shafts respectively connected to said bladed driving elements so as to be rotated thereby in opposite directions, a load shaft, planetary gearing connecting said oppositely rotating shafts jointly to drive the load shaft including a planetary spider connected with the load shaft, a planet shaft journalled in said planetary spider having a plurality of planet wheels fast thereon, a sun wheel fast on one of said oppositely rotating shafts in mesh with one of said planet wheels, a ring gear wheel fast on the other of said oppositely rotating shafts in mesh with another of said planet wheels, a second sun wheel in mesh with a further planet wheel and a second ring gear wheel in mesh with a still further planet wheel, and braking means for selectively restraining said second sun wheel and said second ring gear wheel against rotation.

KARL BAUMANN.

REFERENCES CITED

The following references are of record in the file of this patent:

UNITED STATES PATENTS

| Number | Name | Date |
|---|---|---|
| 516,917 | Coleman | Mar. 20, 1894 |
| 713,637 | Henning | Nov. 18, 1912 |
| 1,138,630 | Crawford | May 11, 1915 |
| 1,313,058 | Bonom | Aug. 12, 1919 |
| 1,369,148 | Von Zweigbergk | Feb. 22, 1921 |
| 1,475,271 | Ahlbrecht | Nov. 27, 1923 |
| 1,515,321 | Ahlm et al. | Nov. 11, 1924 |
| 1,604,730 | Weyer | Oct. 26, 1926 |
| 1,696,836 | Bushyager | Dec. 25, 1928 |
| 2,276,695 | Lavarello | Mar. 17, 1942 |
| 2,291,120 | Tipton | July 28, 1942 |
| 2,341,512 | Burtnett | Feb. 15, 1944 |
| 2,351,213 | James | June 13, 1944 |
| 2,355,876 | Lazaga | Aug. 15, 1944 |

FOREIGN PATENTS

| Number | Country | Date |
|---|---|---|
| 413,797 | France | Aug. 18, 1910 |
| 560,584 | Germany | Oct. 4, 1932 |
| 577,556 | France | June 6, 1924 |